United States Patent [19]

Ishida et al.

[11] Patent Number: 4,992,962
[45] Date of Patent: Feb. 12, 1991

[54] AREA SET OPERATION APPARATUS

[75] Inventors: Tomotoshi Ishida; Shiro Nonaka; Yasumasa Kawashima, all of Hitachi; Kumiko Itoh, Mito, all of Japan

[73] Assignee: Hitachi, Ltd., Tokyo, Japan

[21] Appl. No.: 187,513

[22] Filed: Apr. 28, 1988

[30] Foreign Application Priority Data

Apr. 30, 1987 [JP] Japan .................. 62-104304

[51] Int. Cl.$^5$ .................................. G06F 15/62
[52] U.S. Cl. ........................... 364/522; 364/521; 340/747; 340/729
[58] Field of Search ... 364/521, 522, 518, 200 MS File, 364/900 MS File; 340/747, 750, 728, 729, 798, 799

[56] References Cited

U.S. PATENT DOCUMENTS

| | | | |
|---|---|---|---|
| 3,602,702 | 8/1971 | Warnock | 340/172.5 |
| 4,694,404 | 9/1987 | Meagher | 364/518 |
| 4,719,585 | 1/1988 | Cline et al. | 364/518 |
| 4,775,946 | 10/1988 | Anjyo | 364/522 |
| 4,791,583 | 12/1988 | Colburn | 364/522 |
| 4,809,346 | 2/1989 | Shu | 382/49 |

OTHER PUBLICATIONS

Kunii et al., "A Functional Model for Constructive Solid Geometry", The Visual Computer, (1985), pp. 3-14.

Wyvill et al., "Space Division for Ray Tracing in CSG", IEEE, CG & A, 4/86, pp. 28-34.

Carlbom, I., "An Algorithm for Geometric Set Techniques", IEEE, CG & A, 5/87, pp. 44-55.

Primary Examiner—Dale M. Shaw
Assistant Examiner—Phu K. Nguyen
Attorney, Agent, or Firm—Antonelli, Terry, Stout & Kraus

[57] ABSTRACT

An area set operation apparatus effecting a set operation of a plurality of n-dimensional areas positioned in a n-dimensional finite space, wherein n (n≧2) is a natural number, includes functions of inputting a plurality of data defining a n-dimensional area positioned in a n-dimensional finite space; repeatedly processing sequential order division of the n-dimensional space to generate a plurality of divided spaces, division of the area to generate a plurality of divided areas corresponding to the divided spaces, and generation of data defining each divided area in each divided space from the data defining the area, until the data defining the area satisfy conditions of data determining areas each including an empty part as represented and a full part by a plurality of inequality expressions, wherein the expressions are related to each other, conditions of data representing empty areas and conditions of data representing full areas, and effecting a set operation of the plurality of divided areas by executing a set operation of the data defining the divided areas corresponding to the divided spaces.

9 Claims, 5 Drawing Sheets

AREA SET OPERATION APPARATUS

BACKGROUND OF THE INVENTION

This invention relates to an apparatus for executing an area set operation and, more particularly, to an apparatus for a set operation of three-dimensional object and its display, which is used in machine design, operational simulation of a numerically controlled machine, operational simulation of a robot, etc.

Further stated more specifically, the present invention relates to an apparatus or a method wherein data for defining a three-dimensional object are inputted, set operation on an object is executed when it is needed and the object is displayed, with its face hidden from an observer's view being eliminated. Further, in case of the operational simulation of a numerically controlled machine, the apparatus inputs data of a shape of raw material to be machined and data of a cutter shape, executes a set operation of differentials between the data of the raw material shape and the data of the cutter shape, and displays a shape after the raw material is machined.

At present, various set operation methods and displaying methods are known. Almost all of them have problems on operation speed because a huge amount of operation is necessary for detection of mutual interference of faces and elimination of hidden faces, which are necessary to execute the set operation and the display. There is an application field in which there is no problem on the operation speed, however, in the field in which operational images such as in the operational simulation are required, processing at a higher speed is required.

Of high speed processing methods, there are Quadtree which treats with a two-dimensional area, and Octree which treats with a three-dimensional area. These methods employ mathematically the same principle.

Quadtree is invented by Warnock as disclosed in U.S. Pat. No. 3,602,702, and Octree is what Hunter G. M. applied Quadtree's concept to a three-dimensional area (a thesis "Computer application and data mechanism effective for graphics" submitted by Princeton College, electronics, computer science course). Further, D. Meagher proposed a method of inputting shape data practically, and displaying, based on Octree's concept, disclosed in Japanese Patent Laid-Open 60-237578.

Further, Geoff Wyvill proposes a model in which Octree is extended to reduce an amount of necessary data (A functional model for constructive solid geometry, The Visual Computer (1985) 1; 3–14; Space Division for Ray Tracing in CSG, IEEE CG & A (1986) April: 28–34). Still further, Ingrid Carlbom proposes a model in which Octree is expanded by another method (An Algorithm for Geometric Set Operations Using Cellular Subdivision Techniques, IEEE CG & A (1987) May: 44–55).

Quadtree method and Octree method have the following problems:

(a) A huge amount of data is necessary and make it practically impossible to process objects of complicated shape.

(b) The Octree can execute, at a high speed, display of images from several specific directions dependent on the coordinate system, however, processing of generation of two-dimensional images viewed from arbitrary directions can not be executed at a high speed.

(c) It is necessary to set in advance dissolution of data representing an object. In case of partial extension being executed later so as to extend beyond the initially set dissolution, many processes are necessary to be carried out again.

(d) When it is used in computer aided design, it is necessary to identify the corresponding point of the face of a three-dimensional object, and the corresponding part in input data, from a point on an image projected to display on a picture frame. In the Octree method, however, it is very difficult.

Further, the Wyvill's method reduces a little an amount of the necessary data, however, the amount is still huge, and can not be treated with practically. The Carlbom's method can treat with only a shape composed of planes.

SUMMARY OF THE INVENTION

An object of the invention is to provide an apparatus which is free of the above-mentioned problems and capable of a set operation of area at high speed, with a relatively small capacity of memory and arbitrary dissolution, and an apparatus which is capable of displaying an image viewed from any direction and identifying the corresponding point of the face of a three-dimensional object and the corresponding part in input data, from an arbitrary point on a displayed two-dimensional object.

The above object is carried out by an apparatus for effecting a set operation of a plurality of n-dimensional areas positioned in a n-dimensional finite space, which apparatus including means for inputting a plurality of data defining a n-dimensional area positioned in a n-dimensional finite space, means for repeatedly processing, until the above plurality of data meet conditions determined by a combination of conditions of data representing an area having an empty part and an full part thereof by plural inequality expressions and a relation therebetween, conditions of data representing the empty areas and conditions of data representing the full area, sequential division of the n-dimensional space, division of the plurality of areas in each of the divided spaces, and generation of data defining the divided areas from the data defining the above-mentioned area, in each of the divided spaces, and means for executing a set operation of the plurality of areas by executing a set operation of the data defining the divided areas corresponding to the divided spaces, wherein n (22) is natural number.

Particularly, in case of three-dimension, the above object is carried out by an apparatus for set operation of areas including means for inputting a plurality of data defining the shape of a three-dimensional object positioned in a three-dimensional finite space, means for repeated by processing, until the above-mentioned data meets conditions determined by a combination of conditions of data representing an area having an empty part and an full part by plural inequality expressions and a relation therebetween, conditions of data representing an empty area and conditions of data representing an full area, sequential division of the space, division of the plurality of objects in each of the divided spaces, and generation of a plurality of data defining the shapes of the divided objects from the data defining the shape of the object, in each of the divided spaces, means for executing a set operation of the plurality of objects by a set operation of the data defining the shapes of the divided objects and corresponding to the divided spaces, and means for projecting, on a display surface, faces of the objects positioned in the divided spaces in predetermined order of space.

The apparatus further optionally includes means for providing information corresponding to faces in the input data, information of the face of the three-dimensional object and information of a relationship between information of the displayed faces, and identifying corresponding points of the face of the three-dimensional object and corresponding parts of the input data from points on a two-dimensional image using the above information.

The set operation of area is carried out as follows. First, a plurality of data defining a n-dimensional area positioned in a n-dimensional space are inputted, next, until the area defining data satisfy the conditions set by combining conditions of data representing an area including an empty part and full part by a plurality of inequality expressions and their relation, conditions of data representing the empty area, and conditions of data representing the full area, such processing is repeatedly executed that the space is sequentially divided, the plurality of areas each are divided so as to correspond to the division of the space, a plurality of data defining each the divided area and generated in each the divided space from the area defining data, and finally, a set operation of the plurality of areas is effected by executing a set operation of the data defining the divided areas and corresponding to the divided space.

Particularly, in case of three-dimension, a plurality of data defining the shape of a n-dimensional object positioned in a n-dimensional space are inputted, until the object shape defining data satisfy the conditions set by combining conditions of data representing an area including an empty part and full part by a plurality of inequality expressions and their relation, conditions of data representing the empty area, and conditions of data representing the full area, such processing is repeatedly executed that the space is sequentially divided, the plurality of objects each are divided so as to correspond to the division of the space, a plurality of data defining the shape of each the divided object and generated in each the divided space from the object shape defining data, a set operation of the plurality of object is effected by executing a set operation of the data defining the shapes of the divided objects and corresponding to the divided space, and an area set operation and area display are executed through projection of the face of the object positioned in the divided space, in predetermined space's order.

Further, in some cases, information corresponding to a face in input data, information of a face of a three-dimensional object and information of the corresponding relation between information of displayed faces are provided, the corresponding point of the face of the object and the corresponding part of input data are identified using the above-mentioned information.

DETAILED DESCRIPTION OF THE INVENTION

An embodiment of the invention is described hereunder referring to FIGS. 2 to 7 and 10.

Figure 10:
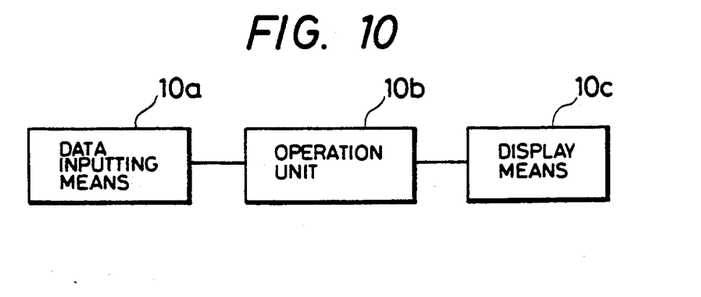
FIG. 10 is a block diagram of apparatus for executing the set operation of area.

Briefly stated, this embodiment is concerned with a method of inputting data of the shape of a three-dimensioned object positioned in a three-dimensional finite space, eliminating a hidden face and two-dimensionally displaying the object. An apparatus for executing the method comprises means 10a for inputting data, an operation unit 10b, and a display means 10c as shown in FIG. 10.

Figure 2:
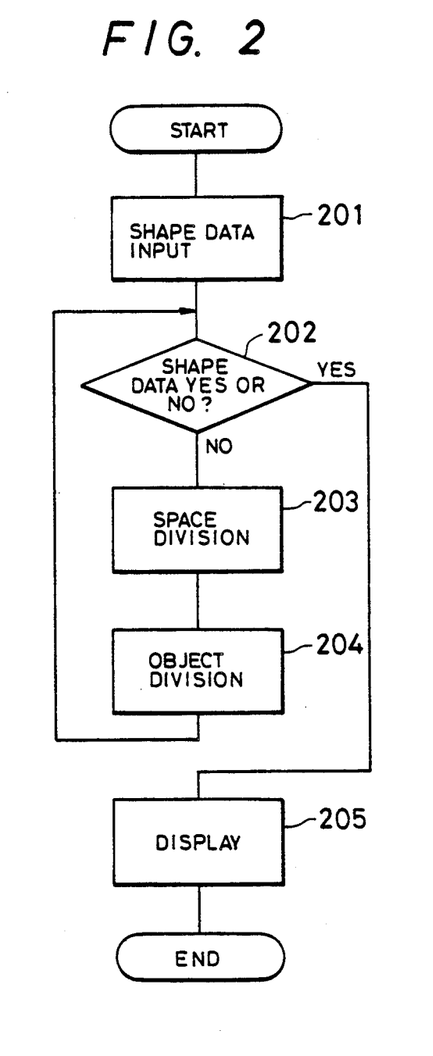
FIG. 2 is a flow chart of a process of a set operation and display of its result according to another embodiment of the present invention.

In FIG. 2 briefly showing a flow chart of execution of the method using an information processing apparatus such as a digital computer, which constitute the apparatus, first of all, data of the shape of a three-dimensional object positioned in a three-dimensional finite space is inputted by the input means at step 201. Next, until this shape data satisfy predetermined or preset conditions, which judgement is executed at step 202, the three-dimensional finite space is divided into eight sections at step 203, and the three-dimensional object included in the space also is divided at step 204. When the conditions are satisfied, a face of the object is projected on a display face of the display means 10c such as CRT (cathode ray tube), a plane display employing liquid crystal, plasma, EL (electroluminescence), etc. at step 205.

Figure 3:
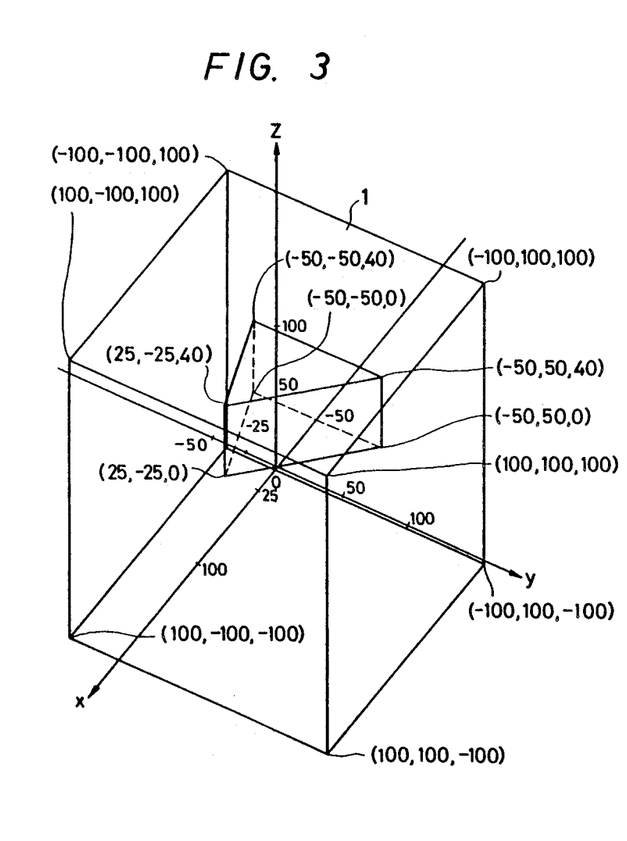
FIG. 3 is an illustrational diagram of an object corresponding to input data.

As an example of the object to be treated with by this method, take up a triangle pole which is positioned in a three-dimensional finite cubic space 1 in the following scorpe ($-100 \leq x \leq 100$),
($-100 \leq y \leq 100$),
($-100 \leq z \leq 100$)

in a x y z orthogonal coordinate system in an outer memory device, for example, and which has the following six vertexes:

(25, $-25$, 0),
($-50$, 50, 0),
($-50$, $-50$, 0),
(25, $-25$, 40),
($-50$, 50, 40), and
($-50$, $-50$, 40).

In this embodiment, a most preferable form of the input data is one representing a shape of an object with inequalities representing an area and relations therebetween. In case of the above-mentioned triangle pole, when information of the shape is represented according to this form, the information comes to descriptive data of the following five inequalities and the relations (and) showing common parts of the area represented by each the inequality:

$$\begin{aligned}
&\text{and} && (x \geq -50) \\
&\text{and} && (x - 3y \leq 100) \\
&\text{and} && (x + y \leq 0) \\
&\text{and} && (z \geq 0) \\
&\text{and} && (z \leq 40)
\end{aligned}$$

However, the invention is not restricted to this form with respect to a form of input data. For example, data of a group consisting of coordinate values of points, equations of faces and topological relations between the points, edges and faces, which are called boundary representation, are sufficient, and data of combination of basic shape elements such as a cube, a column, etc. also are sufficient, however, those data should be data which are discriminatable between the inside and outside of an object, so-called solid model type data.

In this embodiment, first of all, these data defining the shape of the object are inputted at the step 201.

Next, judgement is made on whether or not the data of the shape satisfy predetermined conditions at the step 202. The predetermined conditions mean "the shape can be represented by two or less inequalities", "the entire space is filled with an object", or "the space is filled with none of objects".

These conditions are changeable according to practical manners. Further, such a modification is applicable that in one processing way, several of the conditions are prepared, and they are changed when it is needed. Other examples of the predetermined conditions are such that "the shape can be represented by three or less inequalities, the entire space is filled with an object, or none of objects exists in the space", "the shape can be represented by four or less inequalities, the entire space is filled with an object, or none of objects exists in the space", according to the kinds of inequalities, "the shape can be expressed by one quadratic inequality, the shape can be expressed by less than two linear inequalities, the entire space is filled with an object, or none of objects exist in the space", etc.

These conditions are for judging whether or not the data representing the shape are simplified to such an extent that the data are easily treated with in the step 205 of projection of the face.

Now, in the embodiment, the shape data is composed of five inequalities, so that the conditions are not satisfied, therefore "NO" is selected, and the processing proceeds to the step 202.

Figure 4:
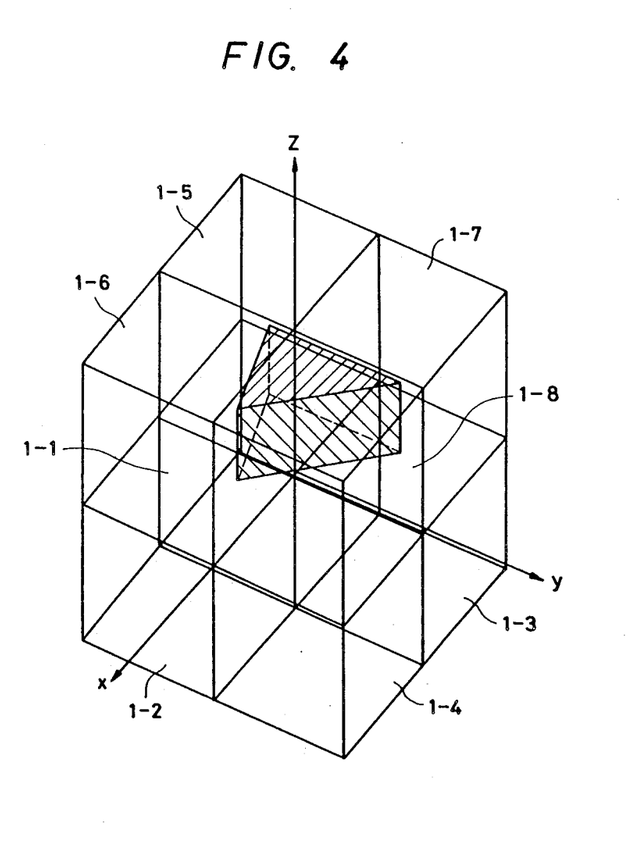
FIG. 4 is an illustrational diagram for explaining division of an object and a space.

As shown in FIG. 4, the space 1 in the memory device is divided into eight at the step 203, for example. Since the space 1 is a cube of one side of 200, the space is divided by the following three planes $x = 0$
$y = 0$
$z = 0$.

As a result, the following eight spaces are formed:

| | | |
|---|---|---|
| 1-1 : | $(-100 \leq x \leq 0)$, | |
| | $(-100 \leq y \leq 0)$, | |
| | $(-100 \leq z \leq 0)$ | |
| 1-2 : | $(0 \leq x \leq 100)$, | |
| | $(-100 \leq y \leq 0)$, | |
| | $(-100 \leq z \leq 0)$ | |
| 1-3 : | $(-100 \leq x \leq 0)$, | |
| | $(0 \leq y \leq 100)$, | |
| | $(-100 \leq z \leq 0)$ | |
| 1-4 : | $(0 \leq x \leq 100)$, | |
| | $(0 \leq y \leq 100)$, | |
| | $(-100 \leq z \leq 0)$ | |
| 1-5 : | $(-100 \leq x \leq 0)$, | |
| | $(-100 \leq y \leq 0)$, | |
| | $(0 \leq z \leq 100)$ | |
| 1-6 : | $(0 \leq x \leq 100)$, | |
| | $(-100 \leq y \leq 0)$, | |
| | $(0 \leq z \leq 100)$ | |
| 1-7 : | $(-100 \leq x \leq 0)$, | |
| | $(0 \leq y \leq 100)$, | |
| | $(0 \leq z \leq 100)$ | |
| 1-8 : | $(0 \leq x \leq 100)$, | |
| | $(0 \leq y \leq 100)$, | |
| | $(0 \leq z \leq 100)$ | |

Next, the object is divided corresponding to the division of the space into the above-mentioned eight spaces, and data defining a shape of each of divided objects in each of the eight spaces are generated, at the step 204. The object is positioned at an area of $z \geq 0$, spaces 1-1, 1-2, 1-3 and 1-4 all are empty. In a space 1-5, a part of the triangle pole is disposed, and the shape of the part is expressed by the following data:

$$\begin{aligned}
& && (x \geq -50) \\
&\text{and} && (z - 3y \leq 100) \\
&\text{and} && (z \leq 40).
\end{aligned}$$

The space 1-5 is completely included in the area expressed by the two inequalities ($x + y \leq 0$ and $z \geq 0$) which disappeared from the shape expressing data in the space 1-5. When only the inside of the space 1-5 is taken to consider, the two inequalities are already unnecessary. Processing in a similar manner, the shape expressing data of the spaces 1-6, 1-7 become as follows

| | | |
|---|---|---|
| 1-6 : | | $(x - 3y \leq 100)$ |
| | and | $(x + y \leq 0)$ |
| | and | $(z \leq 40)$ |
| 1-7 : | | $(x \geq -50)$ |
| | and | $(x + y \leq 0)$ |
| | and | $(z \leq 40)$ | the space 1-8 becomes empty.

The step 204 of division of the object is finished. The process proceeds to the step of 202 of condition judgement of the shape data. The condition judgement of the shape data is executed in a similar manner to the previously executed judgement on each of the divided spaces 1-1, 1-2, 1-3, 1-4, 1-5, 1-6, 1-7 and 1-8.

The spaces 1-1, 1-2, 1-3, 1-4, 1-8 are already empty, so that the processing is not repeated further. The shape data in the space 1-5 are composed of three inequalities, and the predetermined conditions are not satisfied. Therefore, "No" is selected to proceed to the next step 202.

Figure 5:
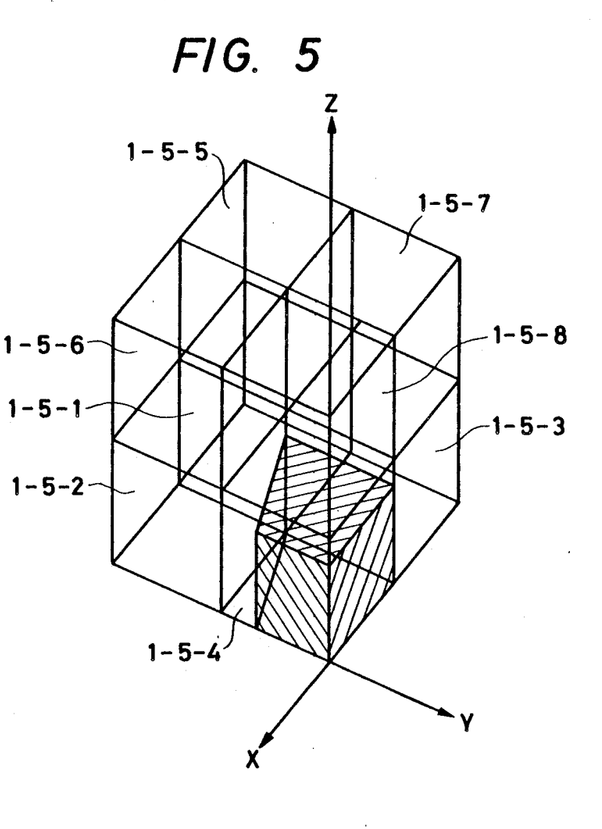
FIG. 5 is an illustrational diagram for explaining division of an object and a space.

As shown in FIG. 5, the space 1-5 is divided into eight spaces at the step 203. The space 1-5 is a cube of one side of 100, so that the space 1-5 is divided equally into eight by the following planes:

$x = -50$
$y = -50$
$z = 50$.

As a result, the following eight spaces are formed:

| | |
|---|---|
| 1-5-1 : | $(-100 \leq x \leq -50)$, |
| | $(-100 \leq y \leq -50)$, |
| | $(0 \leq z \leq 50)$ |

| | |
|---|---|
| 1-5-2 : | $(-50 \leq x \leq 0)$, $(-100 \leq y \leq -50)$, $(0 \leq z \leq 50)$ |
| 1-5-3 : | $(-100 \leq x \leq -50)$, $(-50 \leq y \leq 0)$, $(0 \leq z \leq 50)$ |
| 1-5-4 : | $(-50 \leq x \leq 0)$, $(-50 \leq y \leq 0)$, $(0 \leq z \leq 50)$ |
| 1-5-5 : | $(-100 \leq x \leq -50)$, $(-100 \leq y \leq -50)$, $(50 \leq z \leq 100)$ |
| 1-5-6 : | $(-50 \leq x \leq 0)$, $(-100 \leq y \leq -50)$, $(50 \leq z \leq 100)$ |
| 1-5-7 : | $(-100 \leq x \leq -50)$, $(-50 \leq y \leq 0)$, $(50 \leq z \leq 100)$ |
| 1-5-8 : | $(-50 \leq x \leq 0)$, $(-50 \leq y \leq 0)$, $(50 \leq z \leq 100)$ |

Next, the object is divided into eight spaces, data defining the shape in each of the divided spaces are produced at the step 204. The divided objects all are positioned at the areas of $(z \geq -50)$, $(y \geq -50)$, $(z \leq 50)$, so that the spaces of 1-5-1, 1-5-2, 1-5-3, 1-5-5, 1-5-6, 1-5-7, 1-5-8 all are empty. In the space 1-5-4, a part of the divided object is positioned, and the shape is expressed by the following data:

$$(x - 3y \leq 100) \text{ and } (z \leq 40)$$

In this step 204, the division of the object is finished, and the process proceeds to the step 202 of the condition judgement of the shape data.

The spaces 1-5-1, 1-5-2, 1-5-3, 1-5-5, 1-5-6, 1-5-7, 1-5-8 are already empty, so that the process is not repeated. Further, the shape data in the space 1-5-4 are composed of two inequalities and satisfy the predetermined conditions. By these steps, the inside of the space 1-5 meets the predetermined conditions. In a similar manner, the spaces 1-6, 1-7 are subjected to a similar processing. The above-mentioned results are summed up as follows. The space 1-6 has a space 1-6-3 which does not satisfy the conditions, even if the space is divided into eight. Therefore, only the space 1-6 is further divided into eight spaces.

Figure 6:
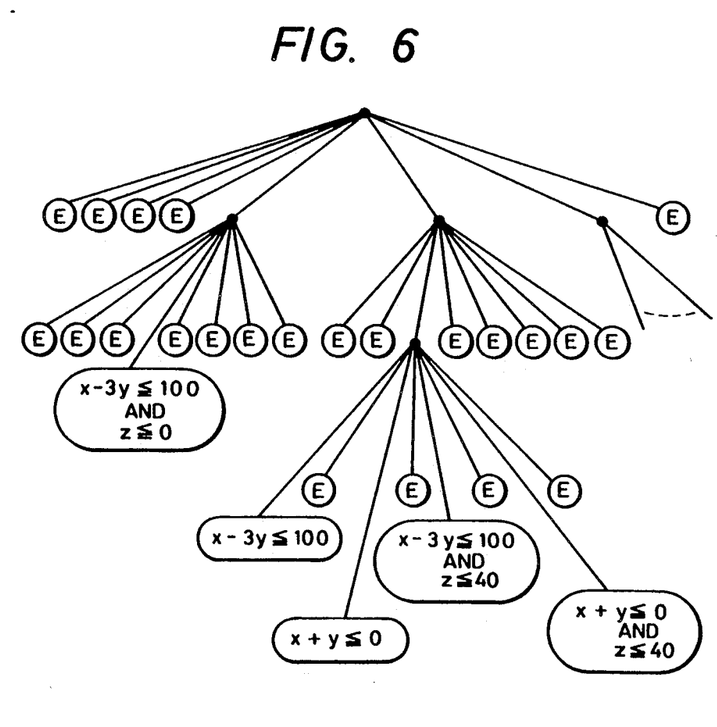
FIG. 6 is an illustrational diagram showing an octtree expression of data representing divided objects.

1-1: empty
1-2: empty
1-3: empty
1-4: empty
1-5-1: empty
1-5-2: empty
1-5-3: empty
1-5-4: $(x - 3y \leq 100)$ and $(Z \leq 40)$
1-5-5: empty
1-5-6: empty
1-5-7: empty
1-5-8: empty
1-6-1: empty
1-6-2: empty
1-6-3-1: $(x - 3y \leq 100)$
1-6-3-2: empty
1-6-3-3: $(x + y \leq 0)$
1-6-3-4: empty
1-6-3-5: $(x - 3y \leq 100)$ and $(Z \leq 40)$
1-6-3-6: empty
1-6-3-7: $(x + y \leq 0)$ and $(Z \leq 40)$
1-6-3-8: empty
1-6-4: empty
1-6-5: empty
1-6-6: empty
1-6-7: empty
1-6-8: empty
1-7-1: empty
1-7-2: $(x + y \leq 0)$ and $(Z \leq 40)$
1-7-3: empty
1-7-4: empty
1-7-5: empty
1-7-6: empty
1-7-7: empty
1-7-8: empty
1-8: empty The result, according to the other expression forms, can be expressed by a tree as shown in FIG. 6 and the following expression form;

$$(0\ 0\ 0\ 0\ (0\ 0\ 0\ (x - 3y \leq 100 \text{ and } x \leq 40)\ 0\ 0\ 0\ 0)$$
$$(0\ 0\ ((x - 3y \leq 100)\ 0\ (x + y \leq 0)\ 0\ (x - 3y \leq 100 \text{ and } z \leq 40)\ 0\ (x + y \leq 0 \text{ and } z \leq 40)\ 0)\ 0)\ 0\ 0\ 0\ 0\ 0)\ (0\ (x + y \leq 0 \text{ and } z \leq 0)\ 0\ 0\ 0\ 0\ 0\ 0)\ 0)$$

wherein empty and full are expressed by 0 and 1, respectively. In this expression form, the shape data of the eight spaces on one level are expressed by bracketing.

Next, the process proceeds to the step 205 of display of face of the object.

In case of projection of faces of a three-dimensional object on a two-dimensional display plane, a simplest and most practical method of displaying the faces, with shade face being hidden, effecting so-called, shade face elimination display is a method, wherein the object is projected in turn from a most remote face from a view point and when the face previously projected and the face projected later overlap on the displaying plane, the face projected later is utilized. Processing which takes most trouble is one wherein distance between the view point and the face is calculated, and the face is rearranged from the remote face.

On the contrary, according to this embodiment, this processing can be reduced greatly. The space 1 defining the three-dimensional object is recursively divided in such a manner that the object is divided into eight spaces, further some of the divided spaces 1-1, 1-2, 1-3, 1-4, 1-5, 1-6, 1-7 and 1-8 each are divided eight spaces. In this case, first, projection order of a first level is determined in such a manner that faces in the remotest space from a view point, of the eight spaces into which the space 1 is divided, are projected first, next, faces in the second-remotest space are projected. Next, in case these spaces are further divided, the processing as mentioned above is carried out in order of remoter spaces.

For example, in data of the triangle pole being taken as an object, in case of parallel projection from a view point (100, 120, 130), the projection order of the first level is determined as in order of the spaces 1-1, 1-5, 1-3, 1-2, 1-7, 1-4, 1-6, 1-8. Of these spaces, for example, projection order of further divided spaces of the space 1-5 becomes as follows: 1-5-1, 1-5-5, 1-5-3, 1-5-2, 1-5-7, 1-5-4, 1-5-6, 1-5-8. Summarizing the above, the projection order is as follows: spaces 1-1, 1-5-1, 1-5-5, 1-5-3, 1-5-2, 1-5-7, 1-5-4, 1-5-6, 1-5-8, 1-3, 1-2, . . . .

In case where calculation is conducted from a view point only, the projection order is as above, however, there is no problem even if the projection order is changed within a extent that upper and lower relation of faces to be projected does not change. Taking this point into consideration, all the cases are satisfied by eight orders prepared according to positive and negative of each of the coordinate values x, y, z of the view point position.

Now, since the projection order of the space to be subjected to projection is determined in the above-mentioned manner, processing of each the space is proceeded. Namely, faces of an object existing in a space are extracted, and the object is projected on the two-dimensional plane with hidden faces being eliminated. The hidden face elimination at this time is much easier than a method of conducting simultaneously elimination of hidden faces of an object in all the spaces and display because by the above-mentioned processing, shape definition data in one space is simplified sufficiently.

Figure 7:
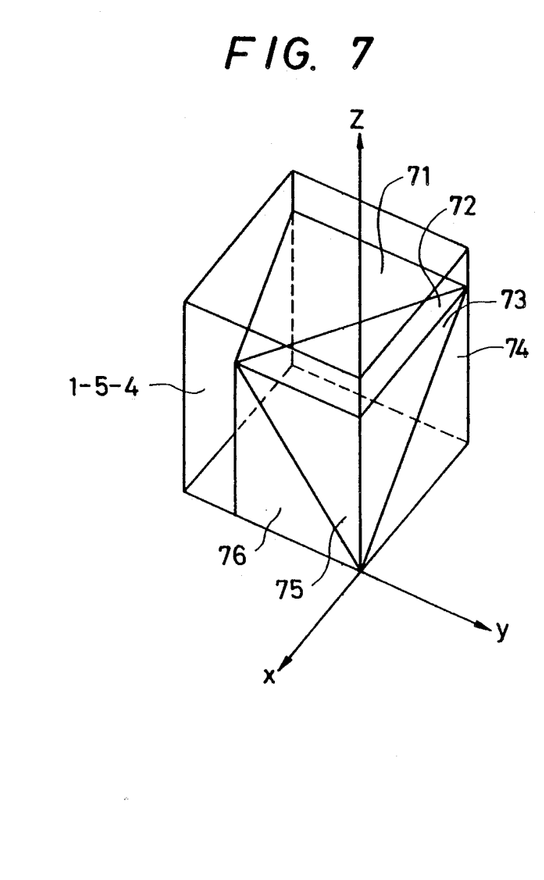
FIG. 7 is an illustrational diagram showing a triangle formed to express an object.

In this embodiment, an object face is converted into triangle through division in case of multi-angle face, or through approximation, in case of a face encompassed by a curved face or a curved line, only a face on a front side is selected from a view point, and the face is projected in turn from a remotest face from the view point. Since the face on a back side is necessarily overwritten later, the face is unnecessary to display. For example, with respect to an object in the space 1-5-4, six triangles 71 to 76 as shown in FIG. 7 are formed, and projected on a display plane.

Figure 1:
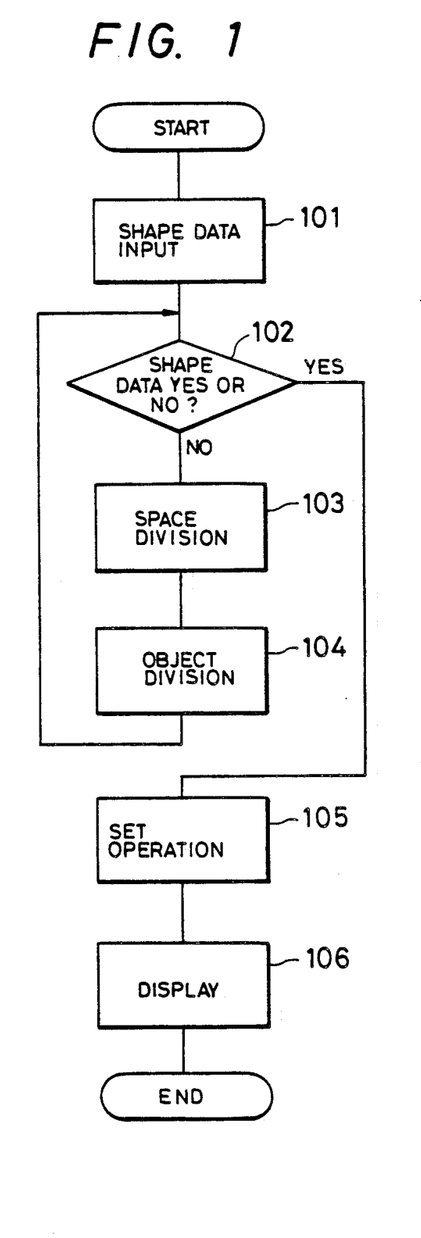
FIG. 1 is a flow chart of a process of a set operation and display of its result in an embodiment of the present invention.
Figure 8A:
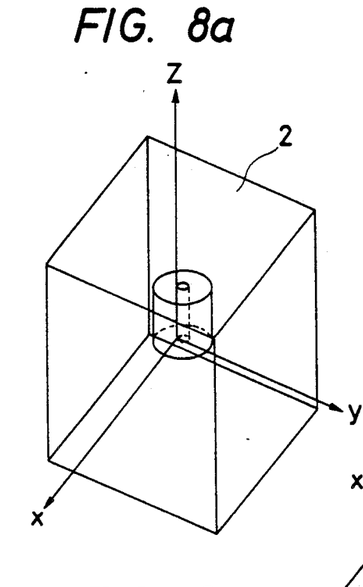
FIGS. 8a, 8b and 8c each are an illustrational diagram expressing an object corresponding to input data.
Figure 8B:
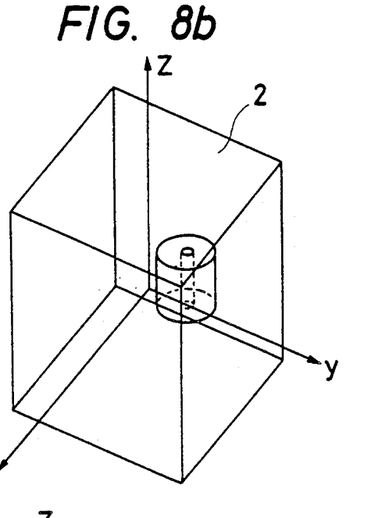
Figure 8C:
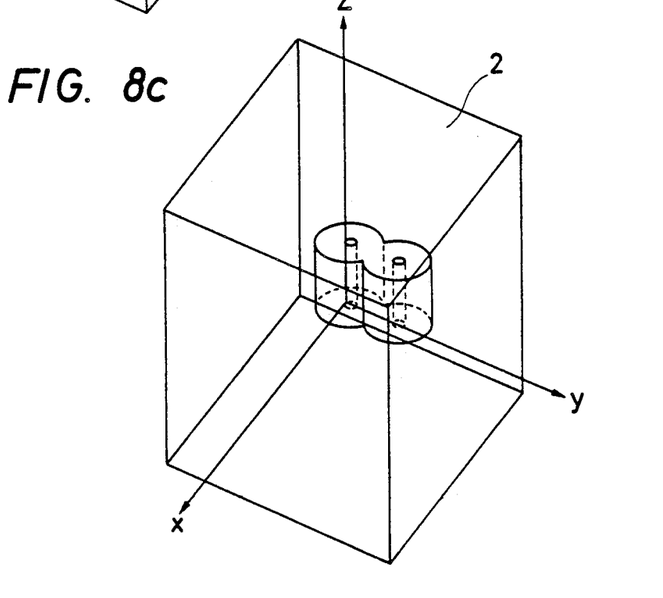
Figure 9:
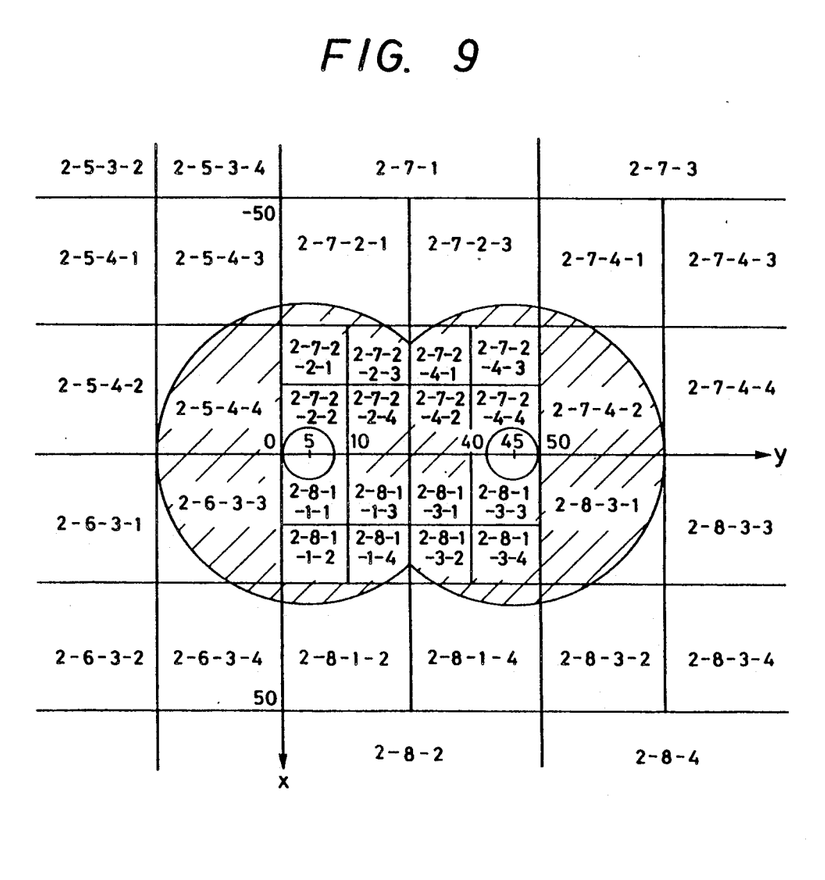
FIG. 9 is an enlarged sectional view of the object corresponding to input data.

Another embodiment of the present invention is described referring to FIGS. 1, 8 and 9.

In this embodiment, shape data of a plurality of three-dimensional objects positioned in a three-dimensional finite space are inputted, a resultant object from set operation is two-dimensionally displayed.

In FIG. 1, a processing in an information processing apparatus such as a digital computer including the apparatus for set operation of area as shown in FIG. 10, according to the invention is briefly shown.

In this processing, first of all a plurality of shape data are inputted by the input means 10a at step 101, next, a space is divided to eight ones at step 103 and the plurality of objects are divided at step 104, until the shape data satisfy a predetermined or preset condition (step 102), if the condition is satisfied, set operation is executed at step 105, and finally, a resultant faces of the objects from the set operation is projected on a display plane at step 106 by the display means 10c.

As an example of objects to be treated with according to this embodiment, an object which is a column of a radius 30 and a height of 30, having a throughhole of a radius 5 and a bottom center (0, 5, 10), and an object which is a column of a radius 30 and a height 30, having a throughhole of a radius 5 and a bottom center (0, 45, 10), each positioned in a three-dimensional finite cubic space 2 in the following range in a x-y-z orthogonal coordinate system:

($-100 \leq x \leq 100$),
($-100 \leq y \leq 100$),
($-100 \leq z \leq 100$), are taken as shown in FIGS. 8a and 8b, and union of the above two objects is considered. The result of the set operation is shown in FIG. 8c the enlarged section of $z=11$ is shown in FIG. 9.

Data defining the shapes of these two objects are as follows:

|   |   |
|---|---|
|     | $(x^2 + (y-5)^2 \leq 30^2)$ |
| and | $(x^2 + (y-5)^2 \geq 5^2)$ |
| and | $(z \geq 10)$ |
| and | $(z \leq 40)$ | and

|   |   |
|---|---|
|     | $(x^2 + (y-45)^2 \leq 30^2)$ |
| and | $(x^2 + (y-45)^2 \geq 5^2)$ |
| and | $(z \geq 10)$ |
| and | $(z \leq 40)$ | respectively.

In the method of this embodiment, first of all, such plurality of data defining the shapes of the objects are inputted at the step 101.

Next, whether or not the shape data satisfy the predetermined conditions is judged at the step 102. The conditions in this embodiment are such that "the shape can be expressed by two or less inequalities, the entire space is filled with an object or objects, none of object exists in the space, or the size of the space is below a prescribed value". In this embodiment, each of the shape data is composed of four inequalities, and the conditions are not satisfied. Therefore, executing the processing in the same manner as in the previous embodiment, the shape data of the two objects are as follows:

|   |   |
|---|---|
| and | (0 0 0 0 (0 0 0 (0 0 A&E A&E 0 0 A&F A&F) 0 0 0 0) (0 0 (0 0 A&E A&E 0 0 A&F A&F) 0 0 0 0 0) (0 (A&E (E B&E A&E E 1 B A 1) 0 A&E A&F (1 B A 1 F B&F A&F)0 A&F) 0 0 0 0 0 0) $^8$(((B&E E E A&E B 1 1 A) A&E A&E 0 (B 1 1 A B&F F F A&F) A&F A&F 0) 0 0 0 0 0 0 0)) |
| and | (0 0 0 0 0 0 (0 (0 C&E C&E (C&E E E D&E C 1 1 D) 0 C&F C&F (C 1 1 D C&F F F D&F) D&F) 0 (C&E C&E 0 0 C&F C&F 0 0) 0 0 0 0) $^8$((C&E 0 (E C&E D&E E 1 C D 1) C&E C&F 0 (1 C D 1 F C&F D&F F) C&F) 1 (C&E C&E 0 0 C&F C&F 0 0) 0 0 0 0 0)) |
| wherein | A : $(x^2 + (y-5)^2 \leq 30^2)$ <br> B : $(x^2 + (y-5)^2 \geq 5^2)$ <br> C : $(x^2 + (y-45)^2 \leq 30^2)$ <br> D : $(x^2 + (y-45)^2 \geq 5^2)$. <br> E : $(z \geq 10)$ <br> F : $(z \leq 40)$ |

Next, the set operation of union of the objects is executed at the step 105 in the following manner:

(a) If one of the objects is 1, the result is letted 1.

(b) If one of the objects is 0, the other is the result.

(c) If both of the objects are divided into eight pieces, the union in each term is obtained, the results are gathered.

(d) Only one of the objects is divided into 8 pieces, the other object also is divided into eight pieces, the union in each term is obtained and the results are gathered.

(e) If otherwise, since both are inequalities, the space and the objects are repeatedly divided until the data representing the area defined by the two inequalities satisfy the predetermined conditions in the same manner as the first shape data are inputted.

In the previous example, both are divided into eight, so that (c) is executed. In this processing, recursively the union of the first term is obtained. The first term are composed of 0 and 0, so that (b) is executed. Namely, 0 is the result. As for the second to forth terms, the result is 0 from 0 and 0 in a similar manner to the above.

The fifth term is composed of

```
          (0 0 0 (0 0 A&E .....
   and
          0,
``` the result is (0 0 0 (0 0 ..., the sixth term is composed of (0 0 (0 0 A&E ... and 0, the result is (0 0 (0 0 A&E. The seventh term is composed of (0 (A&E (E ... and (0 (0 C&E ... both are divided into eight, so that (c) is recursively executed.

The first term is 0, so that the result is 0. The second term (the seventh term of the second term of the original data) is composed of

```
          (A&E (E B&E ...
   and
          (0 C&E C&E (C&E E E ...,
``` so that concerning the first term is A&E from A&E and 0. The second term (the second term of the second term of the seventh term of the original data) is composed of (E B&E A&E ... and C&E, so that (d) is executed. Namely, C&E are divided into 8 to form (0 0 C&E C&E 0 0 C C) and (c) is executed. The third term of them (the third term of the second term of the seventh term of the original data) is A&E and C&E, so that (e) is executed. In the case A&E include C&E so that the result is A&E.

In such a case, the operation is often stopped under the condition that the size of the space becomes less than the prescribed value finally. At this time, as the result of the term, considered are two methods in one of which the result is caused to be approximately 0 or 1, and in other, the plurality of inequalities and the relations therebetween are recorded as they are, they are developed when it is needed. In this embodiment, the later method is employed. As the prescribed value of the space, a value corresponding to resolution on the display is set, in a display processing described later, this term is treated with as 0 or 1, but the term can be developed according to its need when expanded display is required. By this method, it is possible to execute only minimum necessary processing for display.

Set operation on the other part is executed in the same manner as above, the result is as follows:

```
(0 0 0 0 (0 0 0 (0 0 A&E A&E 0 0 A&F A&F)
0 0 0 0) (0 0 (0 0 A&E A&E 0 0 A&F A&F)
0 0 0 0 0) (0 (A&E (E B&E A&E E 1 B A 1)
C&E ...
```

Next, the display processing of the shapes of the objects is executed at the step 105.

In this embodiment also, the display processing is executed by forming triangles through division and approximation of the face of the object to display in each the space and in predetermined space's order in a similar manner to the first-mentioned embodiment, so that the processing for rearranging the faces in order of remoteness of the spaces is eliminated.

Further, in this embodiment, the face of the object does not accord with the boundary faces of the space, so that it is sufficient if on only spaces, partially filled with the objects, of all the divided spaces, triangles are formed and display about faces which are boundaries between the empty part and solid part in such spaces, that is, the faces which do not overlap the boundaries of the space. In other words, upon tracing the space, in the empty spaces and fully filled spaces, none of processing is executed and the processing proceeds to the next step. In the spaces that the inequalities are recorded, the processing is executed on only the spaces expressed by the inequalities. As a result, according to the embodiment the display can be effected at a higher speed than in the first mentioned embodiment.

This method can be applied to processing of an object encompassed by only curved faces, without providing the processing with any conditions. Further, when an object having flat faces is treated with, the processing of this embodiment can be applied to processing of such object if all the flat faces do not overlap the boundary faces of the space. Therefore, it is applicable by beforehand rotating the object or the coordinate system in a direction that all the planes do not perpendicularly cross the coordinate axis.

In this embodiment, on the midway of such set operation and display processing, relations among inequalities in the input data, the face of the three-dimensional divided objects and the two-dimensional shapes projected on the display plane. Therefore, when one point on a displayed two-dimensional image is given, the inequalities, the face of the object and the coordinate values on the face, corresponding to the point of the given display plane can be obtained by first of all, detecting which of the two-dimensional shapes projected on the display plane includes this point, extracting the inequalities corresponding to the detected two-dimensional shape and the face of the three-dimensional object by using the previous data, next calculating a view line from the coordinate on the two-dimensional display plane and a view line direction, and solving simultaneous equations of an equation of the view line and an equation which is obtained by changing an unequal sign of the inequality into an equal sign.

In this embodiment, union operation is shown as set operation, however, multiplying operation and differential operation can be employed.

Further another embodiment is a method of checking interference which may take place at operation line of a robot.

When moving courses of an arm of the robot is examined, a method of defining a space of dimensions corresponding to the number of rotation axes $\theta_1$, for linkage, and recording information of whether or not the movement of the arm interferes in the space is often used. Mathematically, this belongs to an expression of an area of a n-dimensional space.

In this embodiment, an area in which the interference takes place is expressed according to the present invention.

Further, the movement of a tip of the robot arm is expressed by determining in advance the movement of the robot arm tip, expressing the trace of the rotation axes $\theta_1$, when the arm is moved using the same n-dimensional space as mentioned above, and expanding a little the trace to be a bar-like line in order to have a little margin. Next, multiplication set operation of the interference area of the previously expressed n-dimensional space and the bar-like trace in the n-dimensional space is effected in the n-dimensional space. If the result is not empty, it is judged that interference takes place, whereby interference in the n-dimensional space can be judged as interference in three-dimensional space.

What is claimed is:

1. An apparatus for effecting a set operation of a plurality of data of a n-dimensional area positioned in an n-dimensional finite space, wherein n (n>2) is a natural number, said apparatus comprising:

means for inputting a plurality of data defining said n-dimensional area positioned in said n-dimensional finite space;

means for repeatedly processing in sequential order division of said n-dimensional finite space to generate a plurality of divided spaces, division of said n-dimensional area to generate a plurality of divided areas, corresponding to the divided spaces, and generation of data defining each divided area in each divided space, from said data defining said area, until said data defining said area satisfy conditions determined by data representing areas each having an empty part and a full part as indicated by a plurality of inequality expressions, said inequality expressions being related to each other, conditions of data representing empty areas and conditions of data representing full areas; and means for effecting a set operation of said plurality of data of said n-dimensional area by executing a set operation of said data defining said divided areas corresponding to said divided spaces.

2. An apparatus as defined in claim 1, wherein said natural number n is three or more.

3. An apparatus for effecting set operation of a plurality of data of a three-dimensional object positioned in a three-dimensional space, comprising:

means for inputting a plurality of data defining a shape of a three-dimensional object positioned in said three-dimensional space;

means for repeatedly processing in sequential order division of said three-dimensional space to generate a plurality of divided spaces, division of said three-dimensional object to generate a plurality of divided objects corresponding to said divided spaces, and generation of data defining a shape of each divided object corresponding to each divided space from said data defining said shape of said object, until said data defining said shape of said object satisfy conditions of data determining area each including an empty part and a full part as represented by a plurality of inequality expressions, said inequality expressions being related to each other, conditions of data representing empty areas and conditions of data representing full areas;

means for effecting a set operation of said plurality of data of said three-dimensional object by executing a set operation of said data defining said shapes of said divided objects corresponding to said divided spaces; and means for projecting faces of said divided objects positioned in said divided spaces on a display face, in a predetermined order of said divided spaces.

4. An apparatus as defined in claim 3, wherein said projecting means projects only a part or parts, of said shapes of said divided objects, which do not accord with a boundary of said space, only when said divided objects positioned in each divided space partially fill said divided space.

5. An apparatus as defined in claim 3, further including means for identifying a point of a face of a three-dimensional object and a corresponding part of said input data from points of a two-dimensional image of said face, by providing information corresponding to said face of said input data, information of said face of said three-dimensional object and information of a relationship between information of displayed faces, in order to identify said point on the face of said three-dimensional object and said corresponding part of said input data from said points of said two-dimensional image projected on said display plane.

6. An apparatus for effecting a set operation of a plurality of data of an area comprising:

means for inputting a plurality of data defining a shape of a three-dimensional object positioned in a three-dimensional space;

means for repeatedly processing in sequential order division of said three-dimensional space to generate a plurality of divided spaces, division of said three-dimensional object to generate a plurality of divided objects corresponding to said divided spaces, and generation of data defining a shape of each divided object corresponding to each divided space from said data defining said shape of said object, until said data defining said shape of said object satisfy conditions of data determining areas each including an empty part and a full part as represented by a plurality of inequality expressions, said inequality expressions being related to each other, conditions of data representing empty areas and conditions of data representing full areas; and means for projecting faces of said shapes of said divided objects positioned in said divided spaces on a display plane, in a predetermined order of said divided spaces.

7. An apparatus as defined in claim 6, wherein said projecting means projects only a part or parts, of said shapes of said divided objects, which do not accord with a boundary of each space, only when said divided object positioned in each space partially fill said divided space.

8. An apparatus as defined in claim 6, further including means for identifying a point of a face of a three-dimensional object and a corresponding part of said input data from points of a two-dimensional image of said face, by providing information corresponding to said face of said input data, information of said face of said three-dimensional object and information of a relationship between information of displayed faces, in order to identify said point on said face of said three-dimensional object and said corresponding part of said input data from said points of said two-dimensional image projected on said display plane.

9. An apparatus for effecting a set operation of a plurality of data of an n-dimensional area positioned in an n-dimensional finite space, wherein n (n≧2) is a natural number, said apparatus comprising;

means for inputting a plurality of data defining said n-dimensional area positioned in said n-dimensional finite space;

means for repeatedly processing in sequential order division of said n-dimensional space to generate a plurality of divided spaces, division of said n-dimensional area to generate a plurality of divided areas corresponding to the divided spaces, and generation of data defining each divided area in each of the divided spaces from said data defining said n-dimensional area, until conditions are satisfied that include at least one of conditions of data representing divided spaces each having an empty part and a full part as expressed by inequality expressions of less than a predetermined number, said expressions being related to each other, and conditions of divided spaces each being full and conditions of divided spaces each being empty; and means for effecting a set operation of said plurality of said data of said n-dimensional area by executing a set operation of data defining said divided areas corresponding to said divided spaces.

* * * * *